Dec. 12, 1961    H. J. BALDWIN ET AL    3,012,526
METHOD OF INJECTING LIQUIDS INTO THE SOIL
Filed Dec. 23, 1958    3 Sheets-Sheet 3
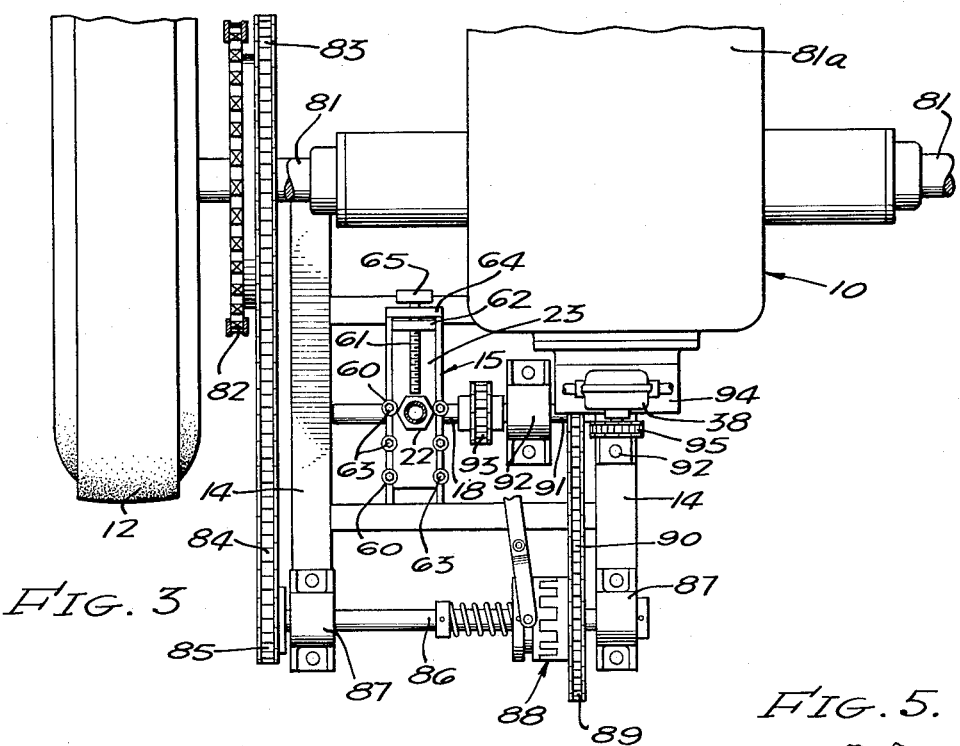
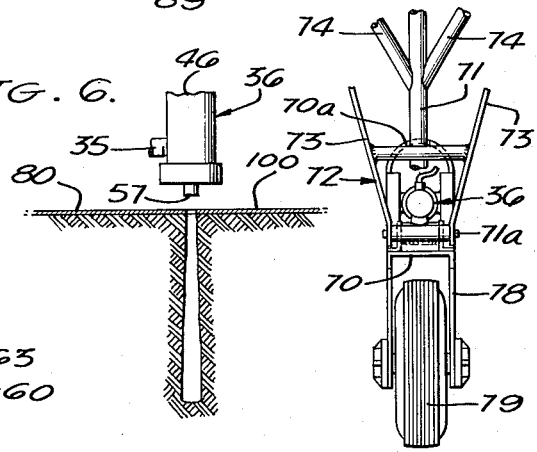
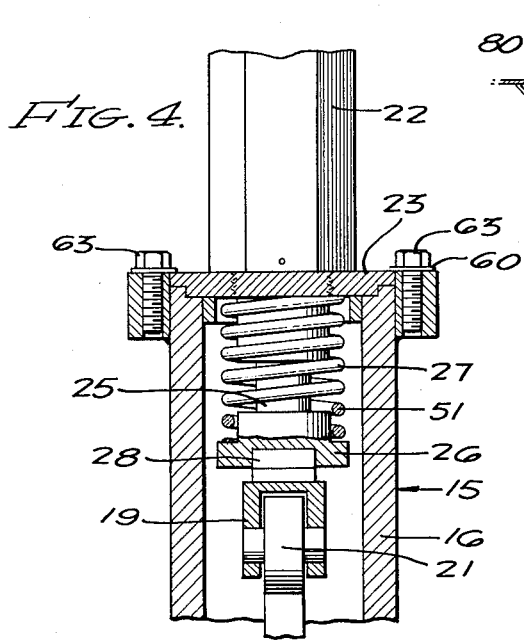
HENRY J. BALDWIN,
PATRICK F. WALKER,
JOHN F. CYKLER,
ROY T. TRIBBLE,
INVENTORS
BY *Lyon & Lyon*
ATTORNEYS

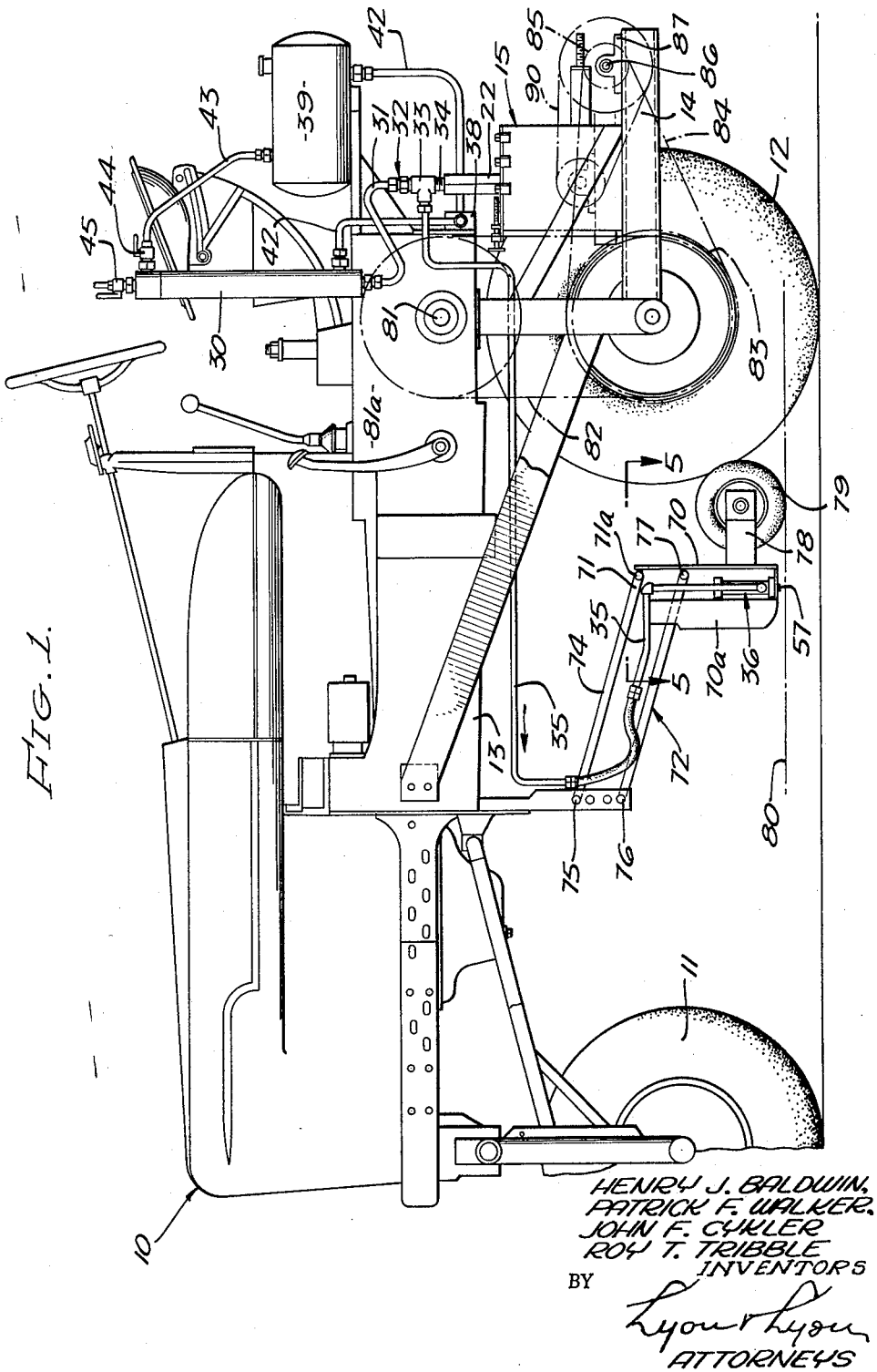

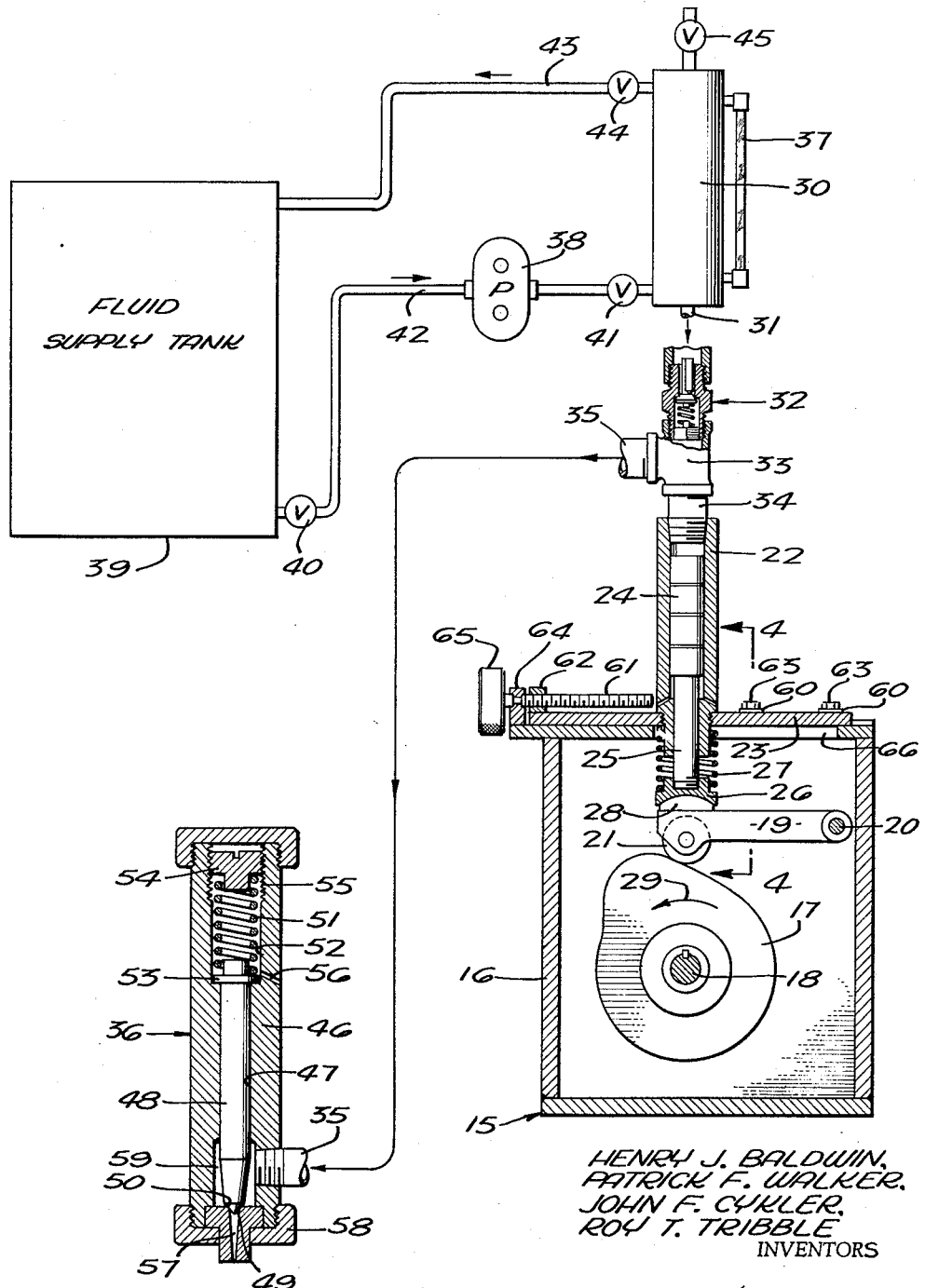

United States Patent Office 3,012,526
Patented Dec. 12, 1961

3,012,526
METHOD OF INJECTING LIQUIDS INTO THE SOIL
Henry J. Baldwin and Patrick F. Walker, Haliimaile, Maui, and John F. Cykler and Roy T. Tribble, Honolulu, Oahu, Hawaii, assignors to Pineapple Research Institute of Hawaii, Honolulu, Hawaii
Filed Dec. 23, 1958, Ser. No. 782,604
8 Claims. (Cl. 111—6)

This invention relates to the injection of agricultural chemicals into the soil without employing the usual spike or shank and is particularly directed to a method for injecting liquids such as soil fumigants, liquid fertilizers and insecticides by jet penetration. We have found that it is possible and practicable to inject agricultural chemicals into the soil from a moving vehicle by propelling elongated consolidated slugs of liquid at high velocity so that the unconfined slugs are caused to penetrate the soil while substantially intact and before breaking up to any considerable degree. The slug is propelled from an ejector device positioned in close proximity to the soil, for example, within a fraction of an inch thereof. Penetration depths of 6" to 8" or more are readily achieved with pressures of 500 p.s.i. to 1500 p.s.i., depending on the condition of the soil.

The method does not require the use of any hollow shank or spike projecting below the ground surface, and instead the liquid chemicals are caused to penetrate the soil by high velocity jet action. The liquid slug is consolidated and substantially without voids, as contrasted with the spray of droplets emitted by a conventional nozzle.

The method of our invention will be explained in connection with the description of the operation of a preferred form of apparatus. Detailed objects and advantages will appear hereinafter.

In the drawings:

FIGURE 1 is a side elevation, partly broken away, showing liquid injection apparatus carried on a wheel tractor.

FIGURE 2 is a diagrammatic view of the apparatus including sectional views of the high pressure pump and delivery valve.

FIGURE 3 is a top plan view of a portion of the apparatus shown in FIGURE 1.

FIGURE 4 is a sectional detail taken substantially on the lines 4—4 as shown in FIGURE 2.

FIGURE 5 is a detail plan view taken substantially on the lines 5—5 as shown in FIGURE 1 and turned 180°.

FIGURE 6 is a diagram showing the nature of the size and shape of the cavity formed in the soil by the slug of liquid moving at high velocity.

Referring to the drawings, the tractor generally designated 10 is provided with the usual front wheels 11 which can be steered and with rear wheels 12 which are power driven from the tractor engine. The frame 13 of the tractor is provided with a supporting structure 14 which carries a high pressure pump generally designated 15. As shown in FIGURE 2 of the drawings, this pump 15 includes a casing 16 which provides an enclosure for the cam 17 mounted on the cross shaft 18. A cam follower 19 is pivoted to the casing 16 at 20 and is provided with a roller 21 which rolls on the outer surface of the cam 17. A pump cylinder barrel 22 is carried on the laterally shiftable cover 23 of the casing 16 and a plunger 24 is mounted to reciprocate within this barrel 22. The lower end of the plunger 24 comprises a rod 25 and this rod carries a flanged member 26 at its lower end. The compression spring 27 extends between this member 26 and the cover 23 and serves to hold the member 26 in contact with the self-aligning element 28 slidably mounted on the upper surface of cam follower 19. From this description it will be understood that rotary movement of the shaft 18 and cam 17 in the direction of the arrow 29 serves to cause the cam follower 19 to reciprocate the pump plunger 24 within the stationary barrel 22.

A tank 30 containing liquid is connected by means of conduit 31 and check valve assembly 32 to the T-fitting 33. This T-fitting is connected by nipple 34 to the pump barrel 22 and by high pressure piping 35 to the delivery valve generally designated 36.

The tank 30 is provided with a conventional sight gauge 37 which may be used to determine the rate of consumption of liquid. The tank 30 is filled by means of a small transfer pump 38 which delivers fluid from the supply tank 39 mounted on the frame of the tractor. Shut-off valves 40 and 41 are provided in the piping 42 connecting the supply tank 39 to the calibration tank 30. A return line 43 extends between the tanks 30 and 39 and may be provided with a shut-off valve 44. A vent valve 45 is provided for the tank 30.

The delivery valve 36 comprises an ejector device and includes a stationary housing 46 having a central axial bore 47. An axially movable valve element 48 is mounted to reciprocate in this bore 47 and the lower end of this valve element is provided with a conical seating surface 49 closing against the seat 50. A spring 51 mounted within counterbore 52 acts at one end against a flange 53 provided on the valve element 48 and against an adjustable plug 54 at the other end. The plug is connected to the housing 46 by threads 55. A vent port 56 extends to the counterbore 52 through the wall of the housing 46. The seat 50 has a central discharge opening 57 and this seat is fixed on the housing 46 by means of the threaded cap 58. High pressure piping 35 is connected to the wall of the housing 46 and communicates with the cavity 59 within the housing 46 adjacent the seat 50.

From this description it will be understood that reciprocation of the pump plunger 24 within the barrel 22 serves to draw liquid from the tank 30 past the check valve assembly 32 and then to expel it through high pressure line 35 to the delivery valve 36. When the pressure in the cavity 59 acting on the exposed area of the valve element 48 exceeds the downward force of the spring 51, the valve element 48 is lifted to permit discharge of liquid through the outlet opening 57 in the seat 50. When the seal between the parts 49 and 50 is broken by initial upward movement of the valve element 48, the additional exposed area of the surface 49 assists in raising the valve element 48. The shape of the outlet opening 57 is such as to cause the formation of a consolidated slug of liquid substantially free of voids. This opening may be tapered as shown in the drawings with the large end forming the seat for the surface 49 on the valve element 48. In a typical installation the diameter of the outlet end of the opening is about 0.080". The shape of the opening is such as to prevent the formation of a spray or series of droplets.

Means are provided for adjusting the stroke of pump 15 and as shown in the drawings, this means includes a horizontal screw 61 received in a stationary nut 62 fixed on the slidable cover 23. Threaded hold-down elements 63 on the casing 16 are provided with washers 60 which overlie the upper surface of the casing cover 23 to prevent separation of the parts 16 and 23. The screw 61 is rotatably mounted in a bearing 64 fixed on the casing 16. A knurled knob 65 is fixed on the screw 61 and serves as a means for turning it. Turning movement of the knob 65 serves to cause the nut 62 and casing cover 23 to move laterally with respect to the casing 16, and this lateral movement carries the pump barrel 22 and the associated parts 24, 25, 26 and 27 with it. A clearance slot 66 is provided in the casing 16 to accommodate such movement. The part 28 slides on the upper surface of the cam follower 19.

From this description it will be understood that turning of the knob 65 in a direction to move the pump barrel 22 to the right as viewed in FIGURE 2 serves to slide the part 28 on the upper surface of the cam follower 19 in a direction toward the pivot 20, thereby reducing the effective length of stroke of the pump plunger 24.

The delivery valve 36 is mounted on an upright sled-frame 70 which is pivotally supported on the tractor frame 13 by means of parallel arms 71 and 72. The upper arm 71 is pivoted to the sled-frame 70 at 71a and this arm is provided with diverging bracing struts 74 as shown in FIGURE 5. The arm 71 and struts 74 are mounted on the transverse pivot shaft 75 on the tractor frame. Similarly, the lower arm 72 comprises a pair of diverging parts 73 pivoted to the tractor frame at 76 and pivoted to the sled-frame at 77. A bracket 78 extends rearward from the sled-frame 70 and rotatably supports the presser wheel 79 which rolls on the upper surface 80 of the soil immediately behind the outlet 57 of the delivery valve 36. A plant shield 70a may be fixed to the sled-frame 70 immediately in advance of the delivery valve 36. Mechanical or hydraulic means, not shown, may be provided for raising the sled-frame 70, presser wheel 79 and associated parts to an inoperative position away from the ground surface.

The transverse drive shafts 81 of the tractor 10 extend in opposite directions from the gear case 81a and each of these drive shafts serves to drive one of the rear wheels 12 of the tractor through a chain and sprocket drive 82. A sprocket 83 is fixed on one of the driven sprockets adjacent the wheels 12 and this sprocket 83 drives sprocket 85 through chain 84. The sprocket 85 is fixed on the countershaft 86. This countershaft 86 is mounted in spaced bearings 87 mounted on the support frame 14. A jaw clutch assembly 88 is provided for driving the sprocket 89 from the shaft 86. Chain 90 connects the sprocket 89 with another sprocket fixed on the shaft 91. This shaft 91 is mounted in spaced bearings 92 and is connected to the pump shaft 18 by means of flexible coupling 93. When the clutch 88 is closed, turning movement of the rear wheels 12 of the tractor is effective to cause rotation of the pump shaft 18.

The transfer pump 38 is mounted on the bracket 94 and is driven from the power take-off shaft of the tractor through chain drive 95.

In operation, the supply tank 39 is filled with agricultural chemicals in liquid form and the tractor engine drives the transfer pump 38 to deliver liquid to the calibration tank 30. When the tank 30 is full, the valves 41 and 44 are shut off and the vent valve 45 is open to permit gravity flow from tank 30 into line 31. A clutch, not shown, is engaged to cause power from the tractor engine to be delivered from the rear wheels through a chain drive 82 to cause forward motion of the tractor. The tractor wheels 11 and 12 roll on the ground and the presser wheel 79 rolls along the upper surface of the soil into which liquid injections are made. This upper surface of the soil may be at a different elevation than the ground surface on which the wheels 11 and 12 roll since the presser wheel 79 may roll along the top of a mound or along the bottom of a furrow.

When the clutch 88 is engaged, power from the rear wheels 12 drives the shaft of the high pressure pump 15 and causes liquid to be drawn from the tank 30 through the check valve 32 and delivered under high pressure through line 35. Line 35 conveys the liquid to the delivery valve 36 mounted on the sled-frame 70. A series of liquid slugs are thus propelled at high pressure through the outlet 57 into the soil. The forward motion of the presser wheel 79 serves to close the openings into the soil cavities produced by the high velocity jet of liquid. Mulch paper 100 may be present on the surface 80 of the soil and if so, the liquid slug punctures the paper as it emerges from the outlet 57 and a series of holes are thus formed in the mulch paper.

We prefer to maintain the liquid discharge tip a fraction of an inch above the soil or mulch paper. Pressure up to several thousand pounds per square inch may be employed depending upon the desired depth of penetration and the condition of the soil. However, we have found that pump pressures from 500 p.s.i. to 1500 p.s.i. give satisfactory results and that very high pressures do not produce proportionately greater depths of penetration.

The method and apparatus described herein have been used for post plant fumigation of pineapples. However, liquid fertilizers including anhydrous and aqua ammonia and insecticides can also be injected successfully. Liquids having a specific gravity of from 0.8 to 2.2 have been used successfully. The desired depth of penetration may be obtained with lower discharge pressures provided that the specific gravity of the liquid is increased. It has been found that a liquid with some lubricating qualities is desirable in order to maintain proper operating characteristics of the delivery valve 36. The liquid may be injected at any point between the rows and between the plants, and if desired multiple outlets may be used for injection of liquid on both sides of a row of plants and even for injection into several rows simultaneously.

Having fully described our invention, it is to be understood that we do not wish to be limited to the details set forth above, but our invention is of the full scope of the appended claims.

We claim:

1. The method of injecting liquid into the soil, comprising: forming an elongated consolidated slug of liquid at high pressure and imparting high velocity thereto to cause the unconfined substantially intact slug to penetrate the soil.

2. The method of injecting liquid into the soil comprising: simultaneously forming a pencil-like substantially void-free mass of liquid at high pressure and imparting high velocity thereto in a direction to cause penetration of the soil while the mass of liquid remains substantially intact.

3. The method of injecting liquid into the soil comprising: directing a pencil-like consolidated slug of liquid at high pressure and high velocity in a direction to penetrate the soil while the slug remains substantially intact.

4. The method of injecting liquid into an unconsolidated mass of earth, comprising: propelling at high velocity a pencil-like unconfined consolidated body of liquid and directing said body of liquid at a mass of earth to cause penetration of said bodies of liquid, while intact, into the mass of earth.

5. The method of injecting liquid into an unconsolidated mass of earth, comprising: propelling at high velocity a series of pencil-like unconfined consolidated bodies of liquid at spaced intervals and directing the bodies of liquid, while intact, into the mass of earth.

6. The method of injecting liquid into the soil comprising: intermittently propelling separate slugs of liquid downward from a device positioned adjacent the soil, the slugs being unconfined and moving at high velocity sufficient to cause substantial penetration of the soil.

7. The method of injecting liquid into the soil comprising: intermittently propelling separate slugs of liquid downward from a device positioned adjacent the soil, the slugs being unconfined and moving at high velocity sufficient to cause substantial penetration of the soil, and traversing the device in a direction parallel to the surface of the soil.

8. The method of injecting liquid into a plot of soil covered by a strip of mulch paper comprising: intermittently propelling separate slugs of liquid downward from a device positioned above the upper surface of the mulch paper, the slugs being unconfined and moving at high velocity sufficient to cause passage through the mulch paper and substantial penetration of the soil therebelow, and traversing the device along the strip of mulch paper.

References Cited in the file of this patent

UNITED STATES PATENTS

| | | |
|---|---|---|
| 1,278,216 | Reid | Sept. 10, 1918 |
| 1,278,217 | Reid | Sept. 10, 1918 |
| 1,974,851 | Hurst | Sept. 25, 1934 |
| 2,285,932 | Leavitt | June 9, 1942 |

OTHER REFERENCES

Publication: Agricultural Engineering. Received in Scientific Library January 23, 1958. Only pages 16–19 and 23 required.